(12) United States Patent
Tieke et al.

(10) Patent No.: US 6,781,936 B1
(45) Date of Patent: Aug. 24, 2004

(54) METHOD AND DEVICE FOR RECORDING MARKS IN AN INFORMATION LAYER OF AN OPTICAL RECORD CARRIER

(75) Inventors: Benno Tieke, Eindhoven (NL); Paulus Wilhelmus Maria Blom, Eindhoven (NL)

(73) Assignee: Koninklijke Philips Electronics N.V., Eindhoven (NL)

( * ) Notice: Subject to any disclaimer, the term of this patent is extended or adjusted under 35 U.S.C. 154(b) by 669 days.

(21) Appl. No.: 09/610,251

(22) Filed: Jul. 5, 2000

(30) Foreign Application Priority Data

Jul. 7, 1999 (EP) .............................................. 99202211

(51) Int. Cl.⁷ .............................................. G11B 7/004
(52) U.S. Cl. ................................ 369/59.11; 369/59.12; 369/53.2
(58) Field of Search ........................... 369/59.11, 59.12, 369/53.2, 53.22

(56) References Cited

U.S. PATENT DOCUMENTS 5,732,061 A * 3/1998 Kirino et al. ............... 369/116
6,243,339 B1 * 6/2001 Spruit et al. ............... 369/53.13
6,329,035 B1 * 12/2001 Iwasaki et al. ............ 428/64.1
6,345,026 B1 * 2/2002 Furukawa et al. ........ 369/59.11

FOREIGN PATENT DOCUMENTS

| EP | 0703575 A1 | 3/1996 |
|---|---|---|
| EP | 0902424 A1 | 3/1999 |
| WO | WO9730440 | 8/1997 |
| WO | WO9836411 | 8/1998 |

* cited by examiner

*Primary Examiner*—W. R. Young
*Assistant Examiner*—Michael Battaglia

(57) ABSTRACT

A method and device are described for writing an optical record carrier, in which a mark representing recorded data is written in a phase change layer of a record carrier by a sequence of radiation pulses. A trailing power level (t) having a value higher than the erase power level (e) is introduced after a last write pulse 3 in a sequence. Additionally, the power level of the last write pulse 3 in a sequence may be raised. This results in a reduced jitter of the marks written, especially when writing at high recording speeds.

20 Claims, 6 Drawing Sheets

METHOD AND DEVICE FOR RECORDING MARKS IN AN INFORMATION LAYER OF AN OPTICAL RECORD CARRIER

BACKGROUND OF THE INVENTION

The invention relates to a method of recording marks representing data in an information layer of a record carrier by irradiating the information layer with a pulsed radiation beam, each mark being written by a sequence of pulses, the recorded marks being erasable by irradiating the information layer with a radiation beam having an erase power level (e), said information layer having a phase which is reversibly changeable between a crystal phase and an amorphous phase and said sequence of pulses comprising write pulses having a first write power level (w1), a bias power level (b) between the write pulses, and a trailing power level (t) after a last write pulse of a sequence.

The invention also relates to an optical recording device for recording data in the form of marks in an information layer of a record carrier by irradiating the information layer with a pulsed radiation beam, said information layer having a phase which is reversibly changeable between a crystal phase and an amorphous phase, the device comprising a radiation source providing the radiation beam and a control unit for controlling the power of the radiation beam, the control unit providing a sequence of write pulses for writing a mark and controlling the power of the radiation beam such that it has a first write power level (w1) during the write pulses in a sequence of write pulses, a bias power level (b) between the write pulses in a sequence of write pulses, a trailing power level (t) after a last write pulse of a sequence of write pulses, and an erase power level (e) between sequences of write pulses.

A recording method and a device as defined in the opening paragraphs are known from the international patent application WO 97/30440 (publication date 21 Aug. 1997). A mark is written by a sequence of write pulses. Previously written marks, if any, between the marks being written are erased by applying an erase power level in between the sequences of write pulses. The known sequence has a bias power level between the write pulses and a return to the bias power level after the last write pulse of a sequence of write pulses before rising to an erase power level.

International patent application WO 98/36411 (publication date 20 Aug. 1998) discloses an improved method, which method has the feature that the sequence of write pulses has a bias power level between the write pulses and a cooling power level after the last write pulse of a sequence of write pulses before rising to the erase power level, the cooling power level being in a range between the bias power level and the erase power level.

A change of the bias power level in the known methods affects both the leading-edge jitter and the trailing-edge jitter. The jitter is the standard deviation of the time differences between level transitions in the digitized read signal and the corresponding transitions in a clock signal, the time differences being normalized by the duration of one period of said clock. The last mentioned method, described in WO 98/36411, introduces an additional degree of freedom by making the cooling power level during the cooling period, i.e. the period following the last write pulse in a sequence of write pulses and preceding the rise to the erase power level, independent of the bias power level. This allows the trailing-edge jitter to be influenced almost independently of the leading-edge jitter.

The known methods are suitable for direct-overwrite on a record carrier, i.e. writing information to be recorded in the information layer of the record carrier and at the same time erasing information previously written in the information layer.

It is a disadvantage of the known methods, especially when the marks are written at high recording speeds, that they do not allow a sufficient reduction of the jitter in the read signal obtained from reading marks written by using the known methods.

SUMMARY OF THE INVENTION

It is an object of the invention to provide a method of recording marks of the kind described in the opening paragraph having a further reduced jitter.

This object is achieved when the method of the preamble is characterized in that the trailing power level (t) is higher than the erase power level (e) and lower than the first write power level (w1).

The method according to the invention replaces the cooling power level in the known methods, which is lower than the erase power level (e), by a trailing power level (t) higher than the erase power level (e). Instead of cooling the information layer after a sequence of write pulses, a more or less gradual transition from the write power level of the last write pulse to the erase power level is introduced, resulting in, especially, the trailing-edge jitter of the marks being smaller than the trailing-edge jitter of the marks recorded by the known methods. It may be apparent to one skilled in the art that embodiments of the method according to the invention using more than one trailing power level, such as a stepwise descent from the write power level to the erase power level, provide an even more gradual transition from the write power level of the last write pulse to the erase power level.

The method according to the invention has advantages especially when used in combination with a record carrier comprising an AgInSbTe alloy, such as, for example, a 4-layer stack of $ZnS:SiO_2/AgInSbTe/ZnS:SiO_2/Al$-alloy. These advantages can also be obtained when using record carriers comprising a GeInSbTe alloy. Experiments indicate that, when these alloys are used, the erase process of amorphous marks proceeds via growth of the surrounding crystalline edge to the center of the mark, rather than by nucleation and subsequent growth. Consequently, the written marks have a well-defined shape with sharp edges, leading to intrinsically lower jitter than observed in, for example, GeSbTe-based record carriers currently considered to be very promising for high speed recording. Moreover, the complete erasure time (CET) decreases rapidly with decreasing mark sizes. Because of this, the maximum data rate increases with a decreasing spot size of the radiation beam, which allows high recording speeds when going, for example, to lower wavelengths of the radiation source such as, for example, in the case of blue laser diodes having a wavelength at approximately 400 nm. Combining a record carrier comprising an AgInSbTe, or GeInSbTe, alloy with the method according to the invention allows recording marks to be obtained with a low jitter of the recorded marks at high recording speeds.

A preferred embodiment of the method according to the invention is characterized in that the last write pulse in a sequence of pulses has a second write power level (w2), the second write power level (w2) being higher than the first write power level (w1).

When the write power level of the last write pulse in a sequence of write pulses is increased compared to the write power level of the preceding write pulses in the sequence of write pulses, the trailing-edge jitter is even more reduced.

An embodiment of the method according to the invention is characterized in that the trailing power level (t) is dependent on properties of the record carrier, and a further embodiment of the method according to the invention is characterized in that the second write power level (w2) is dependent on properties of the record carrier.

The trailing power level (t) can be assigned a fixed chosen value. Alternatively, the trailing power level (t) can be assigned a value which value depends on properties of the individual record carrier where marks are to be recorded on. The value of the trailing power level (t) to be used for an individual record carrier can be determined, for example, by a test procedure where sequences of pulses, which sequence each have a different value for the trailing power level (t), are used to record marks, and the resulting marks are read back and are analyzed. Other test procedures can alternatively be used. Finally, the optimal value for the trailing power level (t) corresponding to an individual record carrier may be recorded on that record carrier. In this event the value can be directly read from the record carrier by a recording device. Likewise, the second write power (w2) can be assigned a fixed chosen value, or can be assigned a value which value depends on properties of the individual record carrier where marks are to be recorded on.

It is a further object of the invention to provide an optical recording device of the kind described in the second paragraph adapted for using the method according to the invention.

This object is achieved when the optical recording device of the preamble is characterized in that the trailing power level (t) is higher than the erase power level (e) and lower than the first write power level (w1).

A preferred embodiment of the recording device according to the invention is characterized in that the control unit controls the power of the radiation beam such that it has a second write power level (w2) during the last write pulse in a sequence of write pulses, the second write power level (w2) being higher than the first write power level (w1).

BRIEF DESCRIPTION OF THE DRAWINGS

These and other objects, features and advantages of the invention will be apparent from the following more particular description of embodiments of the invention, as illustrated in the accompanying drawings where.

DETAILED DESCRIPTION OF THE PREFERRED EMBODIMENTS

Figure 1A:
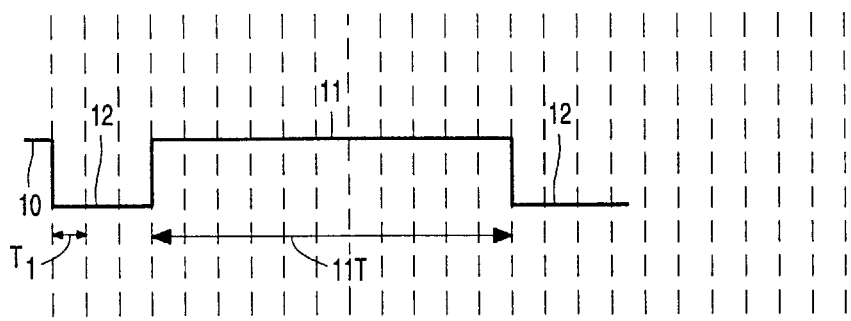
FIG. 1 shows diagrams illustrating the time-dependence of the data signal and of the control signal controlling the power levels of the radiation beam.

FIG. 1 shows diagrams of two signals, a digital data signal 10 and a control signal, 20 or 25, as used in the method according to the invention. FIG. 1a gives the value of the digital data signal 10 as a function of time, the value of the signal representing information to be recorded. The vertical dashed lines indicate transitions in a clock signal of a data clock belonging to the data signal. The period of the data clock, also called the channel bit period, is indicated by $T_1$. When recording this data signal a 'high' period 11 is recorded as a mark having a length corresponding to the duration of the 'high' period and a 'low' period 12 is recorded as a blank area, a space, situated between the marks and having a length corresponding to the duration of the 'low' period. In general, the length of a mark is substantially equal to the number of channel bit periods of the data signal times the writing speed. The length of a mark is therefore often expressed as the number of data clock periods during the corresponding data signal is 'high' (e.g., 11T for a mark with a corresponding data signal being 'high' for 11 data clock periods).

The data is written in an optical record carrier having an information layer. The marks representing the data are written along a track in the information layer by irradiating the information layer with a pulsed radiation beam. The marks are areas of the information layer having optical characteristics different from their surrounding, which makes optical reading of marks possible.

Figure 1B:
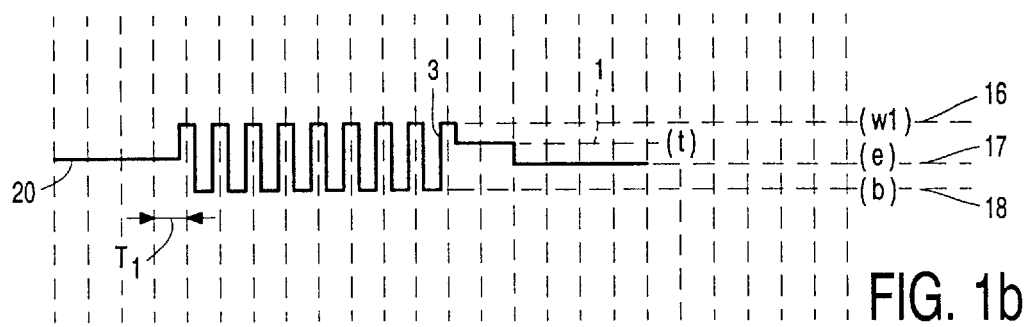
Figure 1C:
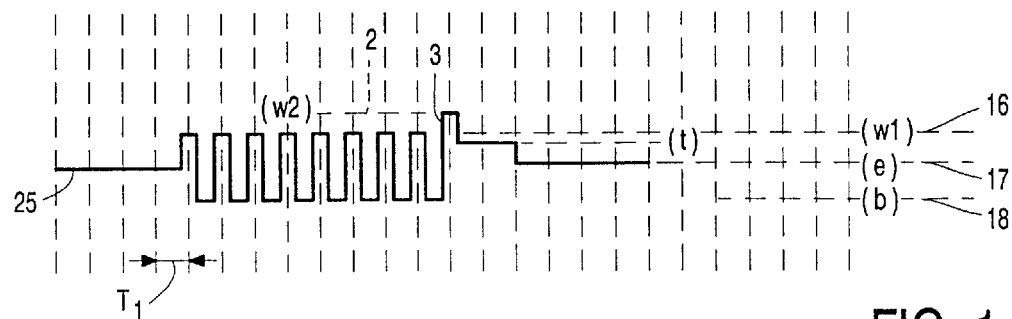

FIG. 1b shows a control signal 20 corresponding to the data signal 10 in a first embodiment of the invention and FIG. 1c shows a control signal 25 corresponding to the data signal 10 in a second embodiment of the invention. The control signal 20 or 25 is used for modulating the power of a radiation beam with which the marks are written on the information layer, where it is assumed that the power level of the radiation beam is proportional to the level of the control signal.

FIGS. 1b and 1c show a sequence of write pulses for writing a mark. The power in between the write pulses, which write pulses have a first write power level (w1) 16, is at a bias power level (b) 18. Previously written marks, if any, between the marks being written are erased by applying an erase power level (e) 17.

In the embodiment of the invention described with reference to FIG. 1b, a trailing power level (t) 1 directly follows the last write pulse 3 in the sequence of write pulses, the trailing power level (t) 1 being higher than the erase power level (e) 17 and being lower than the first write power level (w1) 16.

FIG. 1c relates to an embodiment of the invention where, besides the trailing power level (t) 1 being higher than the erase power level (e) 17 and being lower than the first write power level (w1) 16, the last write pulse 3 in a sequence of write pulses has a second write power level (w2) 2, the second write power level (w2) 2 being higher than the first write power level (w1) 16.

The examples given in FIG. 1 show sequences of write pulses with each write pulse having a duty cycle of 50%. However, write pulses with duty cycles other than 50% may also be used.

In FIGS. 2 and 3 the results are shown from measurements of the leading-edge jitter 311 and of the trailing-edge jitter 321 as a function of the number of DOW cycles 300, i.e. the number of times that marks representing data are recorded on a single record carrier while previously written marks are erased.

Figure 2A:
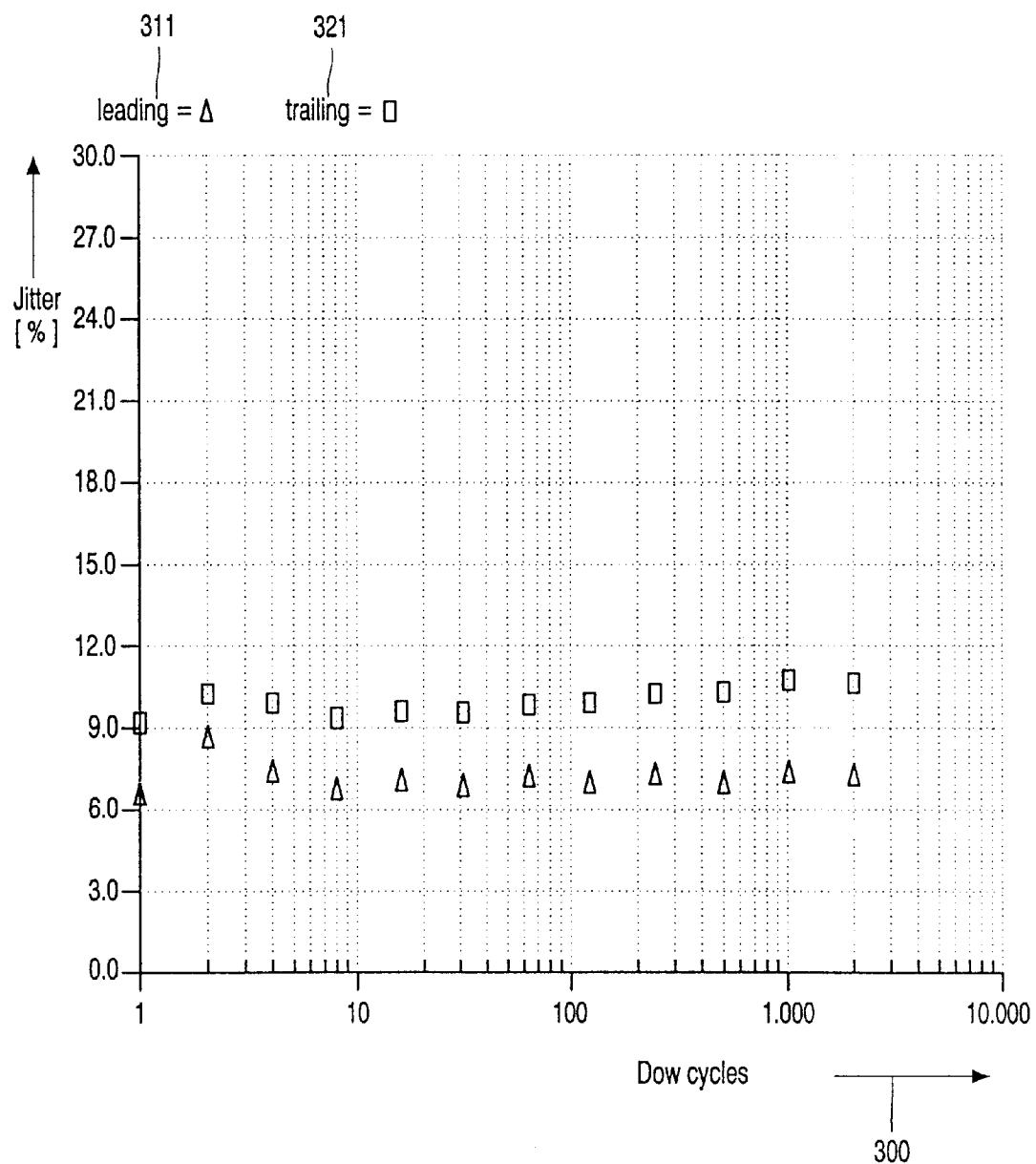
FIG. 2 shows measurements of the jitter, demonstrating the result of applying a trailing power level (t) according to the invention.
Figure 2B:
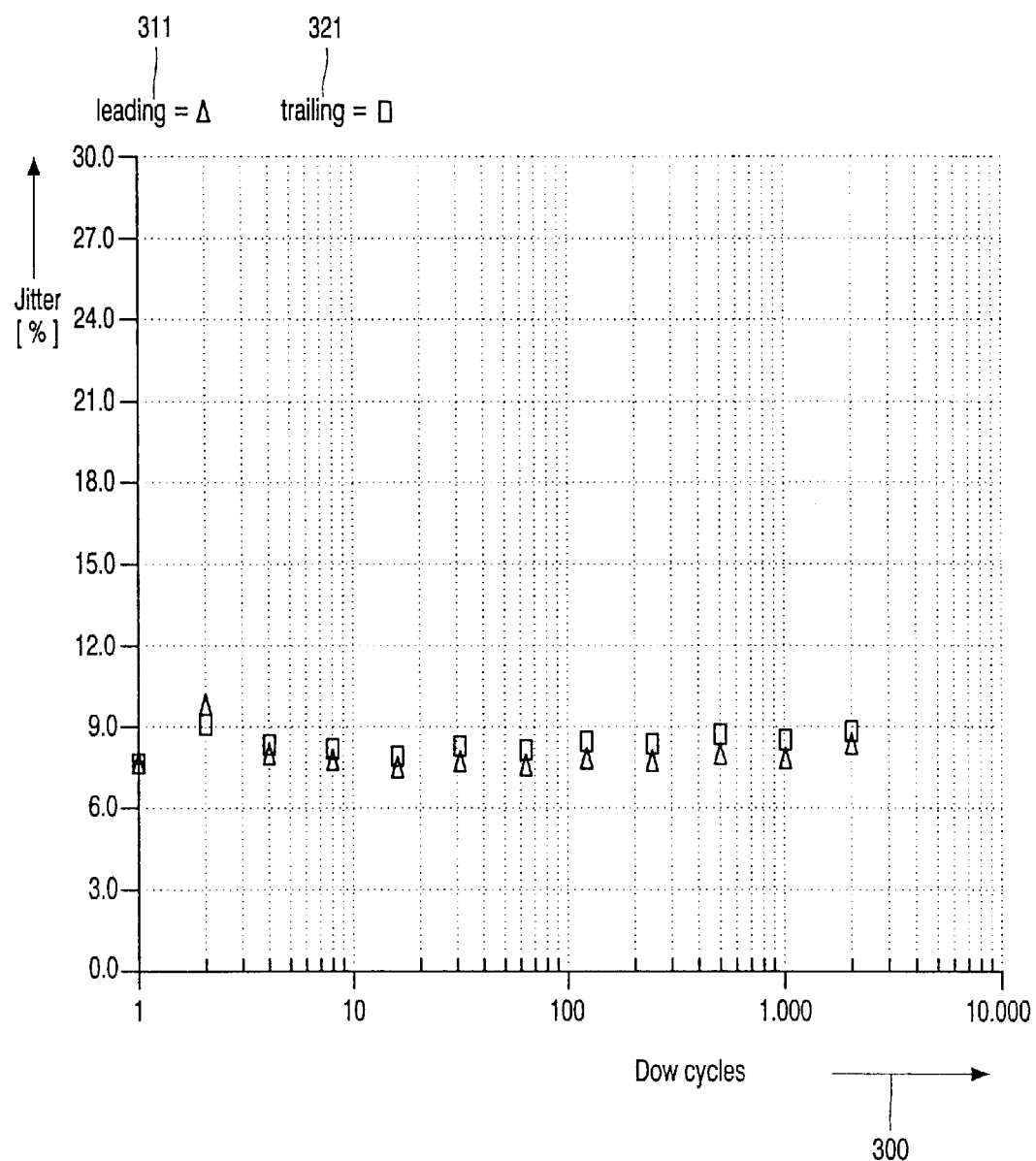

FIG. 2a shows the results of the measurements of the jitter when marks are recorded at a recording speed having a data rate of about 34 Mega-bits-per-second (Mbps) by means of the methods known from the prior art. FIG. 2b shows the results of the measurements of the jitter when marks are recorded at a recording speed having a data rate of about 34 Mbps by means of a method according to the invention where the trailing power level (t) is at a value of about 0.47 times the value of the first write power level (w1), the value of the first write power level (w1) being 6.5 mW and the value of the erase power level (e) being 2.5 mW. A significant decrease of especially the trailing-edge jitter 321 is obtained over the range of the number of DOW cycles shown in the graph.

Figure 3A:
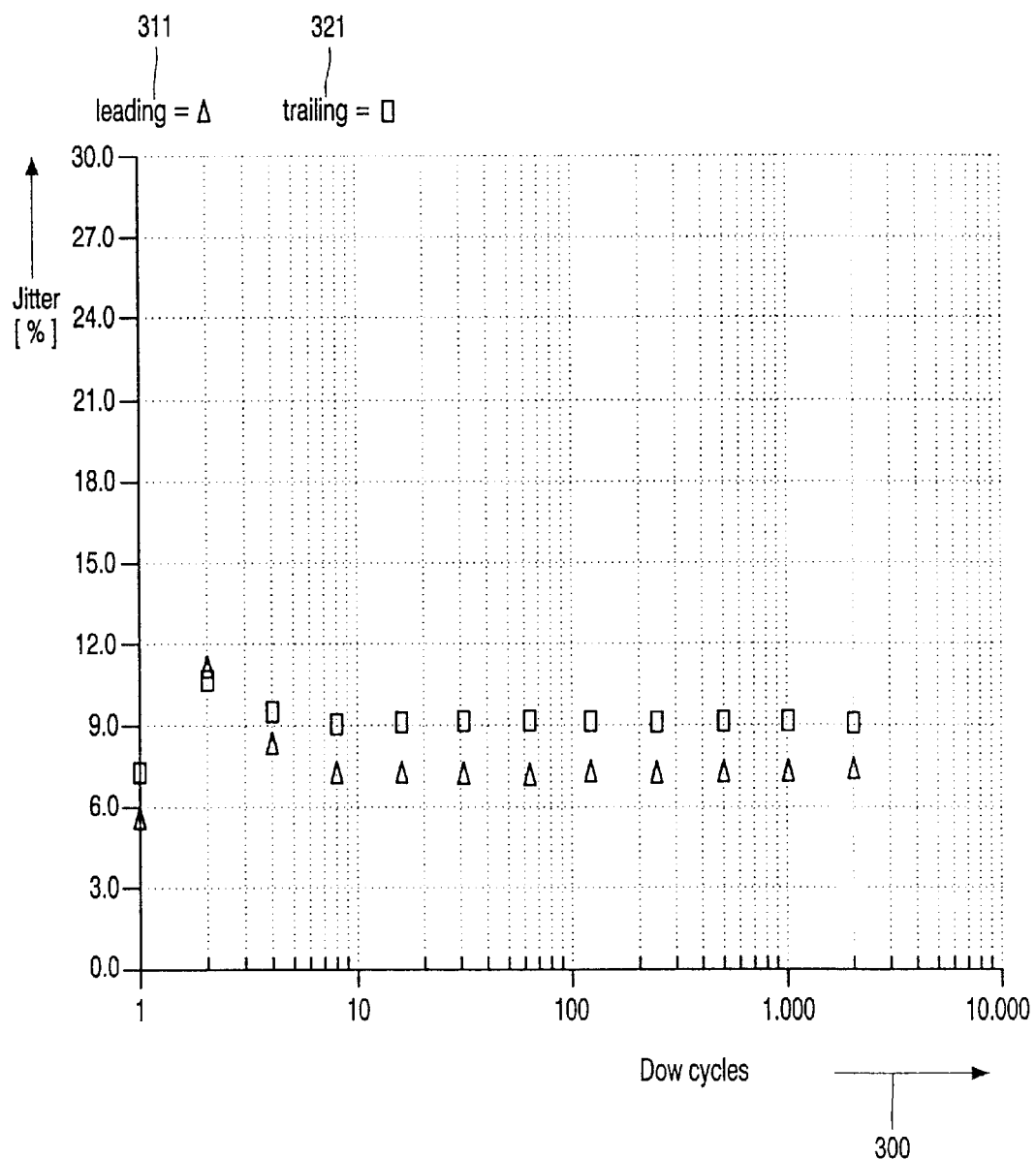
FIG. 3 shows measurements of the jitter, demonstrating the result of applying both a trailing power level (t) and a second write power level (w2) according to the invention.
Figure 3B:
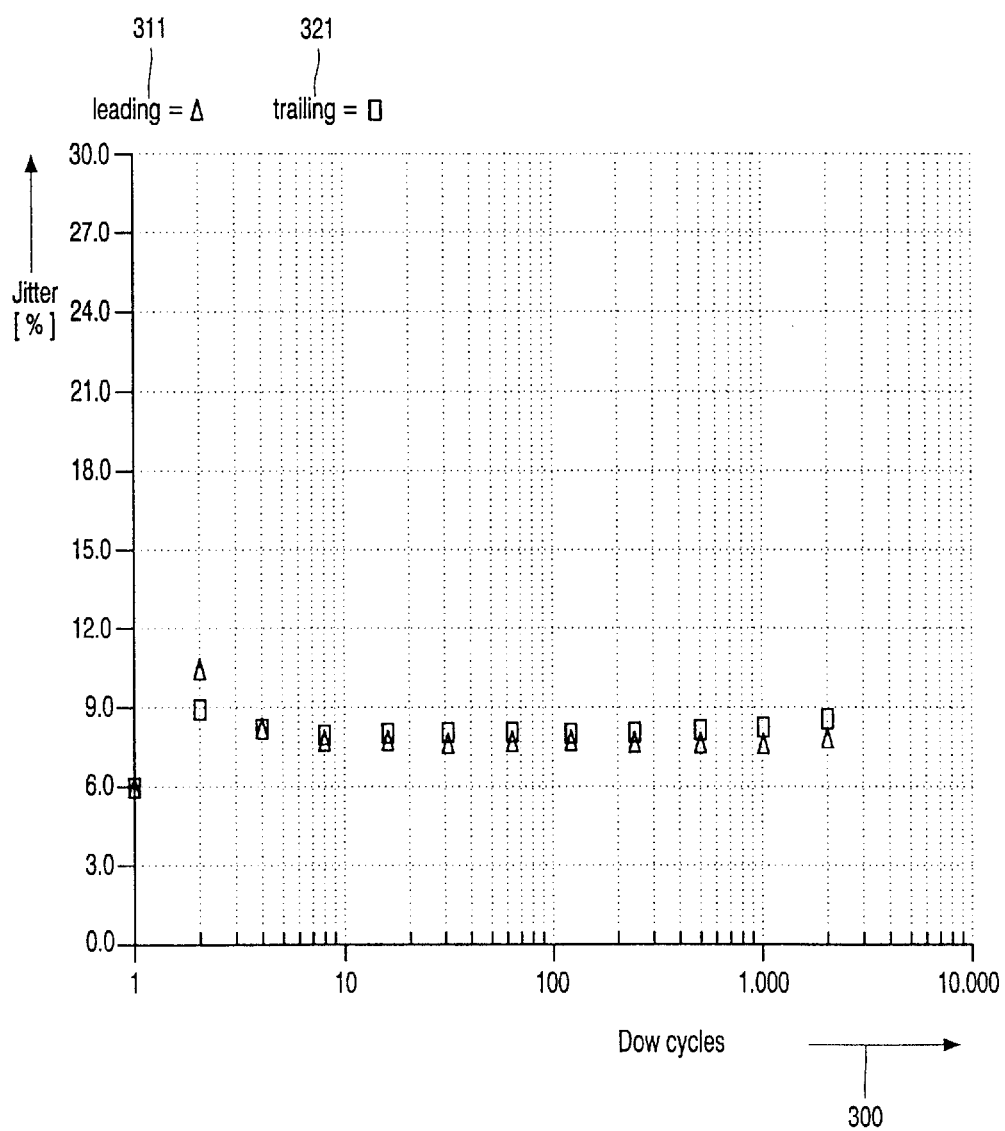

FIG. 3a shows the results of the measurements of the jitter when marks are recorded by means of the same method according to the invention as used when recording the marks whose jitter measurement is shown in FIG. 2b, except for an increased recording speed having a data rate of about 43 Mbps. Because of this increased recording speed, an increase of, especially, the trailing-edge jitter 321 is observed. FIG. 3b shows the results of the measurements of the jitter when marks are recorded at a recording speed having a data rate of about 43 Mbps by means of a method according to the invention where the trailing power level (t) is at a value of about 0.50 times the value of the first write power level (w1) and where the second write power level (w2) is at a value of about 1.10 times the value of the first write power level (w1), the value of the first write power level (w1) being 6.5 mW and the value of the erase power level (e) being 2.5 mW. Again, at this increased recording speed, a significant decrease of especially the trailing-edge jitter 321 is obtained over the range of the number of DOW cycles shown in the graph.

Figure 4:
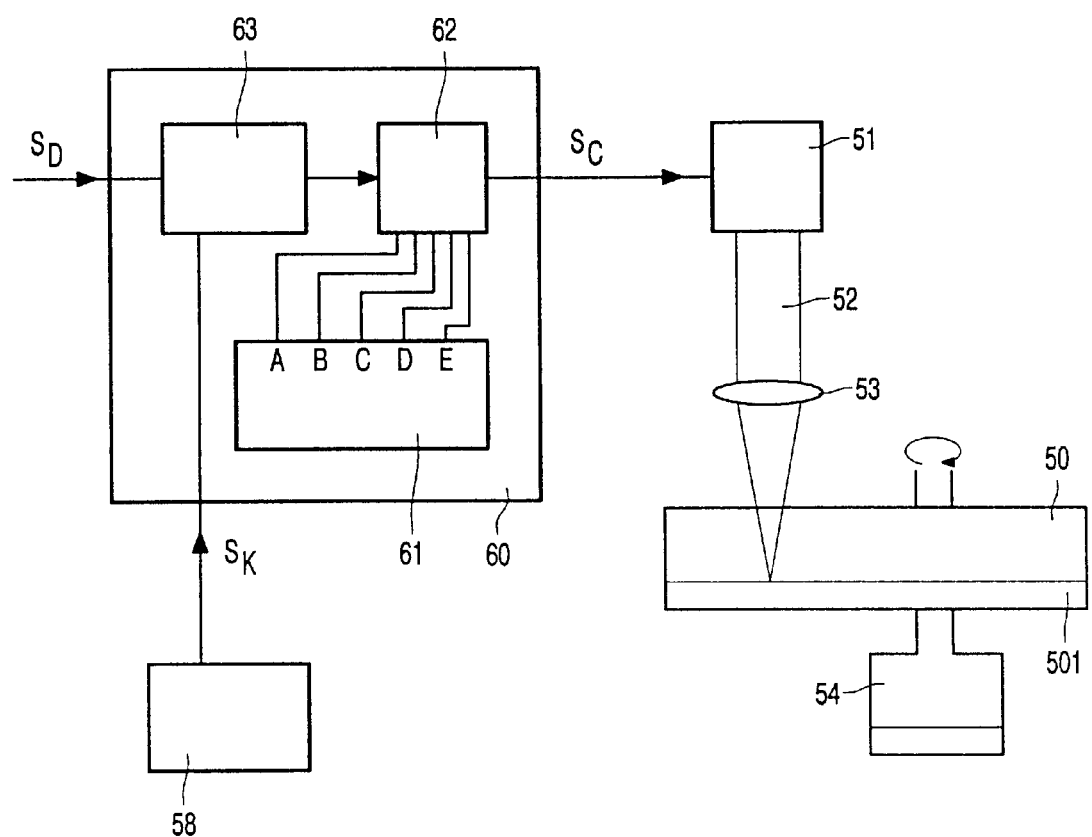
FIG. 4 shows a diagram of a recording device according to the invention.

FIG. 4 shows a recording device according to the invention for recording on a disc-shaped optical record carrier 50. Alternatively, the record carrier may be in the form of a tape. A data signal $S_D$, comprising the information to be recorded, is applied to a control unit 60. A current source 61 within the control unit 60 has five outputs, A, B, C, D and E. Output A provides a current which, when fed into a radiation source 51, through a control signal $S_C$, will result in a radiation beam 52 having a first write power level (w1). Likewise, outputs B, C, D and E provide currents resulting in the bias power level (b), the trailing power level (t), the second write power level (w2) and the erase power level (e), respectively. The current of each output A, B, C, D, and E can be selected by a switch unit 62. The switch unit 62 is operated by a pattern generator 63 controlled by the data signal $S_D$ and a clock signal $S_K$. The pattern generator 63 transforms the data signal $S_D$ into sequences of write pulses having a first write power level, write pulses having a second power level, bias power level, trailing power level, and erase power level according to a desired pattern. The clock signal $S_K$ is obtained from a clock generator 58. When the recording device is used for writing at a single speed, the clock generator 58 is preset at a fixed frequency. When writing at a variable speed the frequency of the clock generator 58 will vary with the actual writing speed.

The control signal $S_C$, provided at the output of the control unit 60 and carrying the sequences of write pulses, is applied to the radiation source 51. The control signal $S_C$ controls the power of the radiation beam 52 generated by the radiation source 51. The radiation beam 52 is focused onto an information layer 501 of the record carrier 50 by a lens 53. The disc-shaped record carrier 50 is rotated around its center by a motor 54.

This embodiment of a recording device according to the invention is suitable for carrying out the methods according to the invention described with reference to FIGS. 1b and 1c using only one trailing power level (t). However, it may be apparent to one skilled in the art that embodiments of a recording device according to the invention using more than one trailing power level, such as a stepwise descent from the write power level to the erase power level, can be realized by adding additional outputs to the current source 61 and by extending the switch unit 62.

What is claimed is:

1. A method of recording marks representing data in an information layer of a record carrier by irradiating the information layer with a pulsed radiation beam, each mark being written by a sequence of pulses, the recorded marks being erasable by irradiating the information layer with a radiation beam having an erase power level (e), said information layer having a phase which is reversibly changeable between a crystal phase and an amorphous phase and said sequence of pulses comprising write pulses having a first write power level (w1), a bias power level (b) between the write pulses, and a trailing power level (t) occurring directly after a last write pulse of a sequence without an intervening bias power level between the last write pulse and the trailing power level, wherein the trailing power level (t) is higher than the erase power level (e) and lower than the first write power level (w1).

2. A method as claimed in claim 1, wherein the information layer having a phase which is reversibly changeable between a crystal phase and an amorphous phase comprises an AgInSbTe alloy.

3. A method as claimed in claim 2, wherein the last write pulse in a sequence of pulses has a second write power level (w2), the second write power level (w2) being higher than the first write power level (w1).

4. A method as claimed in claim 2, wherein the trailing power level (t) is dependent on properties of the record carrier.

5. A method as claimed in claim 1, wherein the last write pulse in a sequence of pulses has a second write power level (w2), the second write power level (w2) being higher than the first write power level (w1).

6. A method as claimed in claim 5, wherein the second write power level (w2) is dependent on properties of the record carrier.

7. A method as claimed in claim 5, wherein the trailing power level (t) is dependent on properties of the record carrier.

8. A method as claimed in claim 1, wherein the trailing power level (t) is dependent on properties of the record carrier.

9. An optical recording device for recording data in the form of marks in an information layer of a record carrier by irradiating the information layer with a pulsed radiation beam, said information layer having a phase which is reversibly changeable between a crystal phase and an amorphous phase, the device comprising a radiation source providing the radiation beam and a control unit for controlling the power of the radiation beam, the control unit providing a sequence of write pulses for writing a mark and controlling the power of the radiation beam such that it has a first write power level (w1) during the write pulses in a sequence of write pulses, a bias power level (b) between the write pulses in a sequence of write pulses, a trailing power level (t) occurring directly after a last write pulse of a sequence of write pulses without an intervening bias power level between the last write pulse and the trailing power level, and an erase power level (e) between sequences of write pulses, wherein the trailing power level (t) is higher than the erase power level (e) and lower than the first write power level (w1).

10. An optical recording device as claimed in claim 9, wherein the control unit controls the power of the radiation beam such that it has a second write power level (w2) during the last write pulse in a sequence of write pulses, the second write power level (w2) being higher than the first write power level (w1).

11. An optical recording device as claimed in claim 10, wherein the optical recording device comprises means for determining properties of the record carrier and means for assigning a value to the second write power level (w2), which value depends on the determined properties of the record carrier.

12. An optical recording device as claimed in claim 10, wherein the optical recording device comprises means for determining properties of the record carrier and means for assigning a value to the trailing power level (t), which value depends on the determined properties of the record carrier.

13. An optical recording device as claimed in claim 9, wherein the optical recording device comprises means for determining properties of the record carrier and means for assigning a value to the trailing power level (t), which value depends on the determined properties of the record carrier.

14. An optical recording device as claimed in claim 9, wherein the information layer having a phase which is reversibly changeable between a crystal phase and an amorphous phase comprises an AgInSbTe alloy.

15. An optical record carrier that contains data that has been placed on said optical record carrier by a method of recording marks representing said data in an information layer of said record carrier, said method comprising irradiating the information layer with a pulsed radiation beam, each mark being written by a sequence of pulses, the recorded marks being erasable by irradiating the information layer with a radiation beam having an erase power level (e), said information layer having a phase which is reversibly changeable between a crystal phase and an amorphous phase and said sequence of pulses comprising write pulses having a first write power level (w1), a bias power level (b) between the write pulses, and a trailing power level (t) occurring directly after a last write pulse of a sequence without an intervening bias power level between the last write pulse and the trailing power level, wherein the trailing power level (t) is higher than the erase power level (e) and lower than the first write power level (w1).

16. An optical record carrier as claimed in claim 15, wherein the information layer having a phase which is reversibly changeable between a crystal phase and an amorphous phase comprises an AgInSbTe alloy.

17. An optical record carrier as claimed in claim 16, wherein the last write pulse in a sequence of pulses has a second write power level (w2), the second write power level (w2) being higher than the first write power level (w1).

18. An optical record carrier as claimed in claim 15, wherein the last write pulse in a sequence of pulses has a second write power level (w2), the second write power level (w2) being higher than the first write power level (w1).

19. An optical record carrier as claimed in claim 18, wherein the second write power level (w2) is dependent on properties of the record carrier.

20. An optical record carrier as claimed in claim 15, wherein the trailing power level (t) is dependent on properties of the record carrier.

* * * * *